US008183523B2

(12) United States Patent  (10) Patent No.: US 8,183,523 B2
Benke  (45) Date of Patent: May 22, 2012

(54) SYSTEM AND METHOD FOR ACQUIRING RADIATION SPECTRAL DATA IN A RADIATION FIELD AND DETERMINING EFFECTIVE DOSE RATE AND IDENTIFYING SOURCES OF LOCALIZED RADIATION

(75) Inventor: Roland Richard Vincent Benke, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 190 days.

(21) Appl. No.: 12/363,497

(22) Filed: Jan. 30, 2009

(65) Prior Publication Data

US 2011/0174983 A1  Jul. 21, 2011

(51) Int. Cl.
| G01V 5/10 | (2006.01) |
| G01V 5/00 | (2006.01) |
| G01T 1/24 | (2006.01) |
| G01T 1/02 | (2006.01) |
| G01T 1/00 | (2006.01) |
| G01J 1/42 | (2006.01) |

(52) U.S. Cl. ............... 250/269.7; 250/265; 250/394; 250/395; 250/370.06; 250/370.07

(58) Field of Classification Search ............... 250/269.7, 250/265, 394, 395, 370.06, 370.07
See application file for complete search history.

(56) References Cited

U.S. PATENT DOCUMENTS

| 4,350,887 A | * | 9/1982 | Barnard et al. | ............... 250/265 |
| 2008/0001090 A1 | * | 1/2008 | Ben-Haim et al. | ....... 250/363.08 |
| 2008/0200780 A1 | * | 8/2008 | Schenkman et al. | ........... 600/310 |
| 2009/0134337 A1 | * | 5/2009 | Russ et al. | .................... 250/394 |

OTHER PUBLICATIONS

Conversion Coefficients for use in Radiological Protection against External Radiation Annals of the ICRP, vol. 26, Issue 3-4, Jan. 1996 (205 pages).
American National Standard ANSI/HPS N13.49/2001, "Performance and Documentation of Radiological Surveys."
U.S. Nuclear Regulatory Commission Regulatory Guide 8.34 "Monitoring Criteria and Methods to Calculate Occupational Radiation Doses" Jul. 1992.
Berger, et al., "Criteria for Performing Multiple Dosimetry," Health Phys. 69(4):570-576 (1995).
U.S. Nuclear Regulatory Commission , Regulatory Issue Summary Jan. 2004, "Method for Estimating Effective Dose Equivalent from External Radiation Sources Using Two Dosimeters," Feb. 17, 2004. (5 pages).
McQuaid, "BNC, Summary Report: Model 935—Certification of Dose Rate Measurements," Performed at the Hazards Control Calibration Facility Lawrence Livermore National Laboratory; Jan. 2001 (5 pages).
Bishop, et al., "Angular Benchmark Data for 16.3 MeV Source Photons of Disc Geometry Penetrating Lead, Steel and Concrete," Ann. nucl. Energy, vol. 12, No. 11, pp. 593-612 (1985).

(Continued)

*Primary Examiner* — David Porta
*Assistant Examiner* — Mindy Vu
(74) *Attorney, Agent, or Firm* — Grossman, Tucker et al

(57) ABSTRACT

A survey method and system for survey method and system for detecting and/or characterizing a radiation field The method may include acquiring energy-dependent radiation spectral data at a location of interest in a radiation field using a detector, wherein the energy-dependent radiation spectral data may include counts versus energy. The method may further include acquiring radiation spectral data at at least one other location wherein the at least one other location is positioned relative to the location of interest.

19 Claims, 11 Drawing Sheets

OTHER PUBLICATIONS

Xu, et al., "A study of the angular dependence problem in effective dose equivalent assessment," Health Physics 1995, vol. 68, No. 2, pp. 214-224.

Rubin, et al., Energy and Angular Distributions of 60Co Gamma Rays Penetrating a Concrete Shield< Nuclear Engineering and Design 16 (1971) pp. 429-443.

Shirakawa, "Developments of directional detectors with NaI(Tl)/BGO Scintillators," Nuclear Instruments and Methods in Physics Research B 213 (2004) 255-259.

Xu, et al., "The Epri Ede Calculator—A software package for assessing effective dose equivalent for hot particles on the skin," Health Phys. 91(4):373-378; 2006.

Xu, et al., "Effective Dose Equivalent for Point Gamma Sources Located 10 CM Near the Body," Health Phys. 91 (2):108-118; 2006.

Bartlett, et al., "The Importance of the direction distribution of neutron fluence, and methods of determination," Nuclear Instruments and Methods in Physics Research A 476 (2002) pp. 386-394.

Luszik-Bhadra, et al, "Measurement of energy and directional distribution of neutron fluence inside a nuclear power plant" Nuclear Instruments and Methods in Physics Research A 476 (2002) pp. 457-462.

Schulte, et al., "Development of a portable directional thermal neutron detection system for nuclear monitoring," Nuclear Instruments and Methods in Physics Research A 422 (1999) 852-857.

Luszik-Bhadra, et al., "A Wide-range direction neutron spectrometer," Nuclear Instruments and Methods in Physics Research A 476 (2002) 291-297.

Smith, "Annals of the ICRP, Radiation Protection,Conversation Coefficients for use in Radiological Protection against External Radiation" ICRP Publication 74, published on behalf of the International Commission on Radiological Protection, Sep. 1995 (220 pages).

* cited by examiner

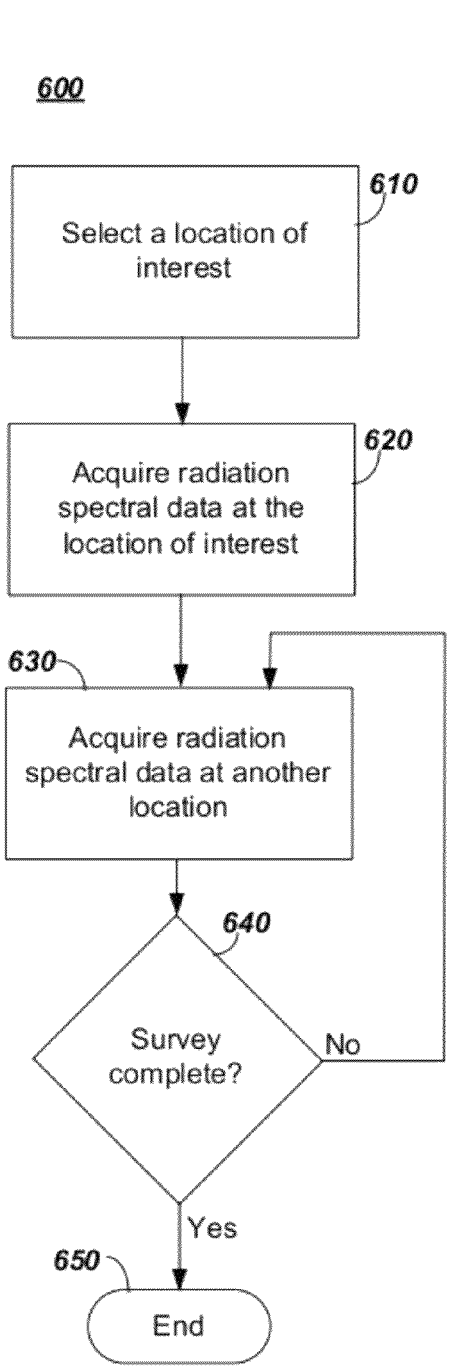
FIG. 6A
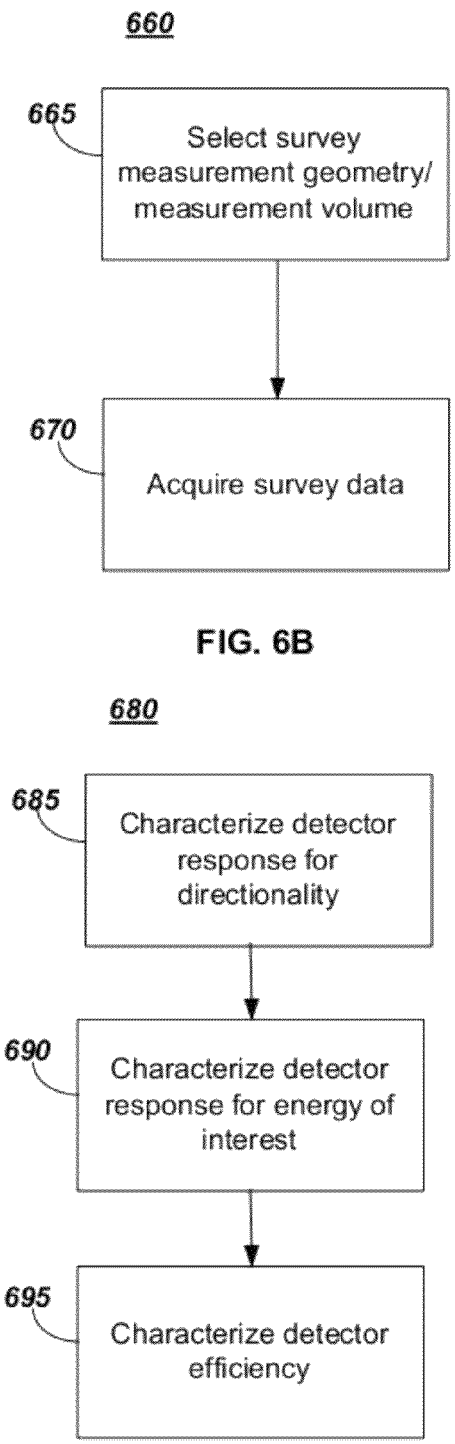
FIG. 6B
FIG. 6C

SYSTEM AND METHOD FOR ACQUIRING RADIATION SPECTRAL DATA IN A RADIATION FIELD AND DETERMINING EFFECTIVE DOSE RATE AND IDENTIFYING SOURCES OF LOCALIZED RADIATION

FIELD OF THE INVENTION

The present disclosure relates to a system and survey method for acquiring radiation spectral data in a radiation field, determining effective dose rate based on the radiation spectral data, and identifying sources of localized radiation.

BACKGROUND

External dose (i.e., from radiation sources outside the body) is a primary consideration for the operation and regulation of many facilities that work with radioactive material. For example, a radiation area designation (e.g., radiation area, high radiation area, and very high radiation area) may be based on measurements corresponding to dose rate. Existing survey instrumentation may not be configured to measure and/or read out effective dose rate, so simplified operational quantities are used as proxies for external dose. The operational quantities may be overly conservative. Accordingly, effective dose may be a relatively better metric for exposure to external radiation. A survey measurement method configured to provide effective dose may therefore be desirable.

SUMMARY

The present disclosure relates in one embodiment to a method. The method includes acquiring energy-dependent radiation spectral data at a location of interest in a radiation field using a detector, the energy-dependent radiation spectral data including counts versus energy. The method further includes acquiring radiation spectral data at least one other location wherein the at least one other location is positioned relative to the location of interest.

The present disclosure relates in another embodiment to a method that includes retrieving an energy-dependent radiation spectrum associated with a location in a radiation field, the energy-dependent radiation spectrum including counts versus energy. The method further includes retrieving at least one other radiation spectrum associated with at least one other location in the radiation field. The method further includes generating a first simplified spectrum and at least one other simplified spectrum based on the retrieved radiation spectra, and determining a dominant direction or a radiation travel path, based at least in part, on the simplified spectra.

The present disclosure relates in yet another embodiment to a system. The system includes a detector configured to (a) acquire energy-dependent radiation spectral data at a location of interest in a radiation field wherein the energy-dependent radiation spectral data includes counts versus energy, and (b) acquire radiation spectral data at least one other location wherein the at least one other location is positioned relative to the location of interest. The system further includes a position sensor configured to sense a position of the detector.

In another embodiment, the present disclosure relates to an article comprising a storage medium having stored thereon instructions that when executed by a machine result in the following operations: retrieving an energy-dependent radiation spectrum associated with a location in a radiation field, the energy-dependent radiation spectrum including counts versus energy; retrieving at least one other radiation spectrum associated with at least one other location in the radiation field; generating a first simplified spectrum and at least one other simplified spectrum based on the retrieved radiation spectra; and determining a dominant direction or a radiation travel path, based at least in part, on said simplified spectra.

BRIEF DESCRIPTION OF THE DRAWINGS

The detailed description below may be better understood with reference to the accompanying figures which are provided for illustrative purposes and are not to be considered as limiting any aspect of the invention.

FIGS. 6A through 6C depict illustrative process flowcharts consistent with the present disclosure.

DETAILED DESCRIPTION

Figure 1A:
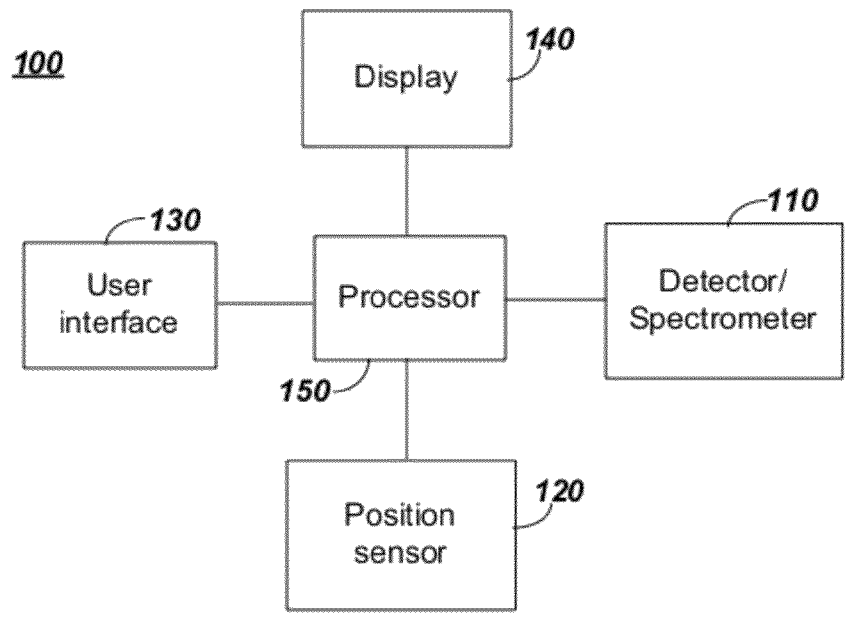
FIGS. 1A and 1B depict illustrative system block diagrams consistent with the present disclosure.

In general, the present disclosure describes a survey method and system for detecting and/or characterizing a radiation field. The method may include detecting a radiation energy spectrum (counts or counts per time versus energy), i.e., radiation spectral data, at a plurality of locations in a radiation field. As used herein, counts may be understood as representing an intensity of a detected radiation energy. The system may include a detector. For example, the detector may be a spectrometer. In an embodiment, the system may include a position sensor. The spectrometer may be configured to detect radiation spectral data at a location in a radiation field. In an embodiment, the location may be sensed by the position sensor.

The present disclosure further describes an analysis method for characterizing detected radiation based on survey data. As used herein, survey data may be understood as radiation spectral data, i.e., detector response in counts versus energy, detected at a plurality of locations. The analysis method may include spectral processing (e.g., spectral subtraction) of the radiation spectral data detected at a location.

The radiation spectral data may be characterized according to its radiation flux distribution and/or location. Based on survey data, a radiation source may be identified, characterized and/or located (i.e., a dominant direction of its incident radiation defined). An effective dose and/or effective dose rate to the whole body (including doses and/or dose rates to individual organs) may be calculated based, at least in part, on survey data. The effective dose may be based on radiation flux from one or more directions that may be based on a distribution of energy-dependent detector responses over a survey volume.

In an embodiment, the methods may be used to identify a radiation source that may be contributing to a radiation field radiation from a plurality of sources. Identification may include determining an incident energy-dependent flux and/or a direction of the source relative to measurement location(s). The methods may be used to determine an effective dose and/or effective dose rate for a receptor positioned and/or oriented at a location in the radiation field.

It may be appreciated that effective dose rate may provide an indication of biological effect produced as a result of irradiation. It may be appreciated that a biological effect may generally be associated with ionizing radiation. As used herein, ionizing radiation may be understood to include alpha particles, beta particles, gamma rays, x-rays, neutrons, high-speed electrons, high-speed protons and/or other particles capable of producing ions. Biological effect may depend on an amount and/or energy of the incident flux and/or direction of the flux relative to an orientation of a receptor. Effect may further depend on a distribution of the flux over the radiation field, e.g., a collimated or highly directional source may produce non-uniform irradiation. Accordingly, the effective dose rate may depend on an intensity of the incident flux and/or orientation of a receptor relative to a direction of the flux.

A survey method may include acquiring radiation spectral data at a plurality of locations in a radiation field. The radiation field may include contributions from one or more radiation sources of one or more particle types and/or geometries. For example, a radiation source geometry may be point, planar and/or volume. Each source may emit radiation at a specific energy or a range of energies and/or in a specific direction or various directions. Each source may contribute to the radiation field and may produce a non-uniform distribution of radiation flux within the radiation field. An effective dose received by a receptor, positioned and/or oriented at a location in the radiation field, may depend on the location and/or orientation of the receptor and the energy and/or direction of components, e.g., uncollided (unscattered) and/or scattered, of the radiation field at that location.

Attention is directed to FIG. 1A which depicts an illustrative block diagram 100 of a system for acquiring radiation spectral data at a location in a radiation field. The system 100 may include a detector 110, a position sensor 120, a user interface 130, a display 140 and/or processor 150. In an embodiment, the detector 110 may be a spectrometer. As used herein a spectrometer may be understood as a device configured to acquire an energy dependent radiation spectrum, i.e., counts versus energy. The spectrometer 110, position sensor 120, user interface 130 and/or display 140 may be coupled to the processor 150. The spectrometer 110 may be configured to detect radiation at a location. It may be appreciated that a detector may generate a radiation spectrum based on a radiation field. The radiation spectrum may be in counts or counts per time versus energy. It may be further appreciated that a detector response may be related to radiation flux and/or fluence based on detector characteristics.

In an embodiment, the location may be detected by the position sensor 120. The processor 150 may be configured to receive radiation spectral data and/or associated location. The processor 150 may be configured to store the radiation spectral data and/or location. In an embodiment, the processor 150 may be configured to provide the radiation spectral data and/or location data to the display 140. In an embodiment, the radiation spectral data for one or more locations may be processed by the processor 150 and the processed data may be displayed on display 140. For example, for a location, the displayed data may indicate a detected radiation spectrum, energy-dependent angular flux of radiation, direction-dependent effective dose rate, and/or accumulated effective dose over time. In another example, the displayed data may indicate a detected count for an energy range at each location. The user interface 130 may be configured to allow a user to adjust the acquisition and/or display of the radiation spectral data.

Figure 1B:
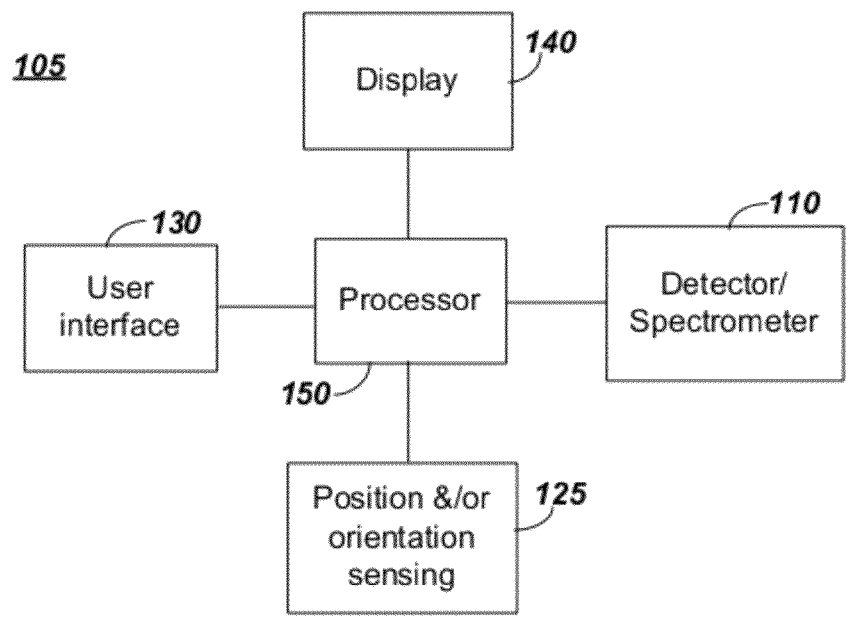

Attention is directed to FIG. 1B which depicts another illustrative block diagram 105 of a system for acquiring radiation spectral data at a location in a radiation field. In the figures, like elements have like reference designators. This system 105 may include a position and/or orientation sensing block 125. The position and/or orientation block 125 may be configured to detect the position and/or orientation of the detector 110. The position and/or orientation data may be used to detect and/or characterize a location (i.e., relative direction of incident radiation) of a radiation source. For example, the displayed data may indicate the direction and/or location of a radiation source. It may be appreciated that a response of the detector 110 may depend on an orientation of the detector 110 relative to a radiation source. Orientation data may be used to account for orientation-dependent effects in the detector 110 response. In an embodiment, orientation data may be used to indicate a direction toward a radiation source. For example, the system 105 may include a pointing device, e.g., a laser pointer, that may indicate a direction toward a radiation source based on orientation and displayed data. It may be appreciated that a system may include a plurality of detectors, a plurality of position sensors, and/or a plurality of orientation sensors.

A survey method may be used to acquire radiation spectral data at a plurality of detection locations. The plurality of detection locations may be situated in a region of interest. The region of interest may be located in a radiation field. For example, the region of interest may be a work area where a human receptor may be likely to enter and/or remain for a period of time. The work area may be configured such that a human receptor may be preferentially positioned at one or more locations in the work area, i.e. near a work surface. The work area may be configured so that the human receptor may preferentially face one or more directions, i.e., orientations. An effective dose received by the human receptor may depend on the position and/or orientation of the human receptor in the radiation field. In other words, the effective dose received by a receptor may depend on the orientation and/or position of the receptor relative to a direction of a radiation flux. The effective dose may depend on an intensity and/or energy distribution of the radiation flux.

The plurality of detection locations may be configured to provide a distribution of radiation spectral data in counts per energy about a location of interest, e.g., a central location, in the region of interest. The plurality of detection locations may be distributed about the central location and may define a measurement volume. It may be appreciated that a radiation flux at a detection location and radiation flux at the central location may differ. It may be further appreciated that a radiation spectrum detected at a detection location and a radiation spectrum detected at the central location may differ. The differences may depend on a distance between the detection location and/or central location and the source. Additionally or alternatively, the difference may depend on a direction of the source radiation relative to a direction defined by relative positions of the central location and the detection location. The differences may be energy-dependent.

Figure 2A:
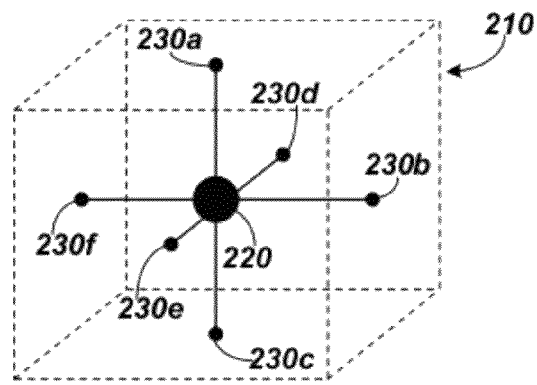
FIGS. 2A through 2C depict illustrative sketches of a rectangular volume including a plurality of detection locations consistent with the present disclosure.
Figure 2B:
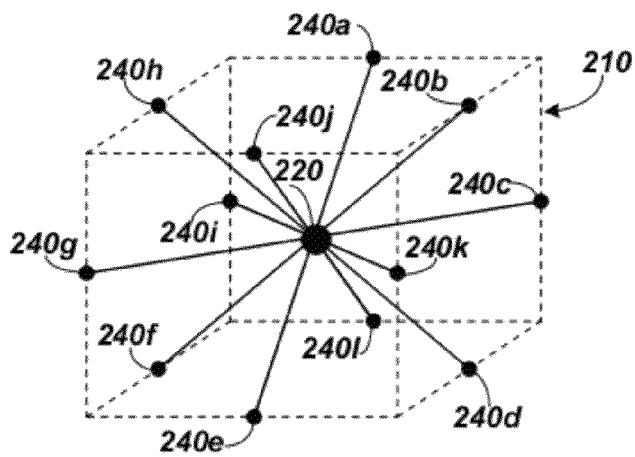
Figure 2C:
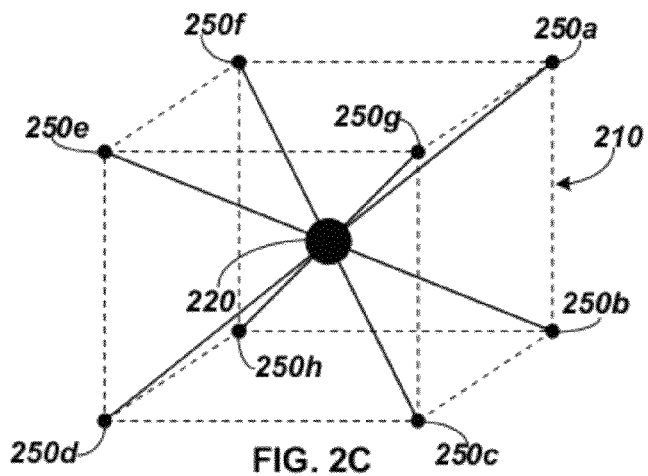

Attention is directed to FIGS. 2A through 2C which depict an example of a substantially cubic measurement volume 210. The measurement volume 210 may include a central location 220. The measurement volume 210 may include a plurality of face detection locations, e.g., an approximate center of each face 230a, ..., 230f, a plurality of edge detection locations, e.g., an approximate center of each edge 240a, ..., 240l, and/or a plurality of corner detection locations, e.g., each corner 250a, ..., 250h. Accordingly, this example may include twenty seven detection locations. A position of each detection location relative to the central location may define a direction, e.g., a primary direction. Accordingly, this example may include twenty six primary directions.

It may be appreciated that FIGS. 2A through 2C depict one embodiment of a distribution of detection locations and/or primary directions. In this embodiment, the measurement volume may be substantially cubic, i.e., may have substantially square faces. In another embodiment, the measurement volume may be right parallelepiped shaped, i.e., may have substantially rectangular faces. In these embodiments the detection locations may include the faces, edges and corners of the rectangular volume 210. In another embodiment, more or fewer detection locations may be included and/or may be distributed differently over the substantially cubic volume 210.

Figure 3A:
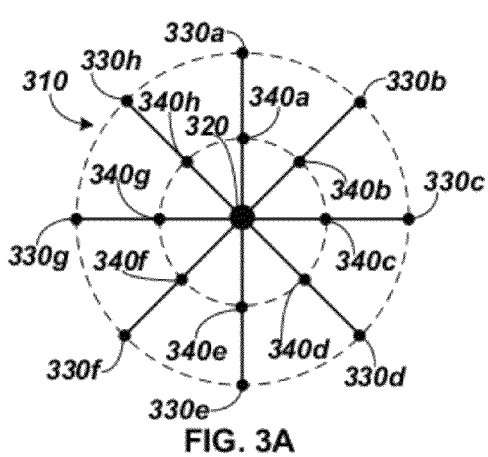
FIGS. 3A and 3B depict illustrative sketches of a spherical volume including a plurality of detection locations consistent with the present disclosure.
Figure 3B:
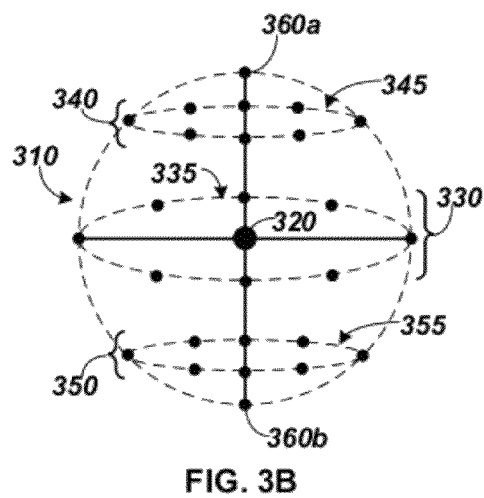

Attention is directed to FIGS. 3A and 3B which illustrate another example of a measurement volume 310. FIG. 3A depicts a top view and FIG. 3B depicts a side view of the measurement volume 310. In this example, the measurement volume 310 may be substantially spherical. The substantially spherical measurement volume 310 may include a central location 320. The central location 320 may correspond to a center of the spherical measurement volume 310. In an embodiment, a plurality of detection locations, e.g., detection locations 330a, ..., 330h, 340a, ..., 340h, 350, 360a, and/or 360b may be distributed about a surface of the spherical measurement volume 310. A position of each detection location relative to the central location 310 may define a direction. The directions may be uniformly spaced and/or may represent equal solid angles.

It may be appreciated that a spheric section may be defined by an intersection of a plane and a sphere. It may be further appreciated that the intersection of the plane and the sphere may be substantially circular. For example, a first spheric section 335 may be defined by a plane that intersects the central location 320. A plurality of detection locations, e.g., detection locations 330a, ..., 330h, designated collectively in FIG. 3B as detection locations 330, may be distributed about the first spheric section 335. In an embodiment, the detection locations 330a, ..., 330h may be substantially uniformly distributed about the first spheric section 335, i.e., may be distributed substantially equidistant from each other. In an embodiment, a distribution of detector locations may define substantially equal solid angles and/or substantially equal areas on the surface of the sphere.

A second spheric section 345 may be defined that may be substantially parallel to the first spheric section 335. The second spheric section 345 may be positioned between the first spheric section 335 and a detection location, e.g., first detection location 360a. A plurality of detection locations, e.g., detection locations 340a, ..., 340h, designated collectively in FIG. 3B as detection locations 340, may be distributed about the second spheric section 345. In an embodiment, the second spheric section 345 may be positioned substantially equidistant from the first spheric section 335 and the first detection location 360a. In an embodiment, the detection locations 340a, ..., 340h may be substantially uniformly distributed about the second spheric section 345, i.e., may be distributed substantially equidistant from each other.

Similarly, a third spheric section 355 may be defined that may be substantially parallel to the first spheric section 335 and may be positioned between the first spheric section 335 and a second detection location 360b. A plurality of detection locations, designated collectively as detection locations 350, may be distributed about the third spheric section 355. In an embodiment, the third spheric section 355 may be positioned substantially equidistant from the first spheric section 335 and the second detection location 360b. In an embodiment, the each of the plurality of detection locations 350 may be substantially uniformly distributed about the third spheric section 355.

In an embodiment, the first detection location 360a and second detection location 360b may be positioned on the surface of the substantially spherical measurement volume 310 and may be substantially aligned with the central location 320. The first detection location 360a and the second detection location 360b may then be separated by a diameter of the substantially spherical measurement volume 310.

Accordingly, this example may include twenty seven detection locations including the central location 320, detection locations 360a, 360b and eight detection locations distributed about each of the spheric sections 335, 345, 355. Twenty seven detection locations may define twenty six primary directions. It may be appreciated that in other embodiments, more or fewer spheric sections and/or detection locations may be designated about the surface of the measurement volume 310. In an embodiment, a distribution of detector locations may define substantially equal solid angles and/or substantially equal areas on the surface of the sphere. It may be further appreciated that detection locations distributed about the surface of the measurement volume 310 may be substantially equidistant from the central location 320.

Figure 4A:
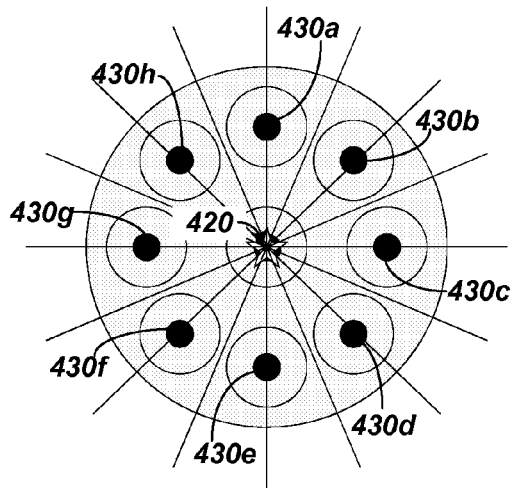
FIGS. 4A through 4D depict illustrative sketches of a cylindrical volume including a plurality of detection locations consistent with the present disclosure.
Figure 4B:
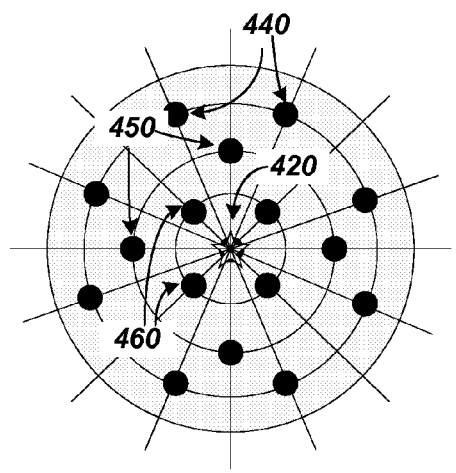
Figure 4C:
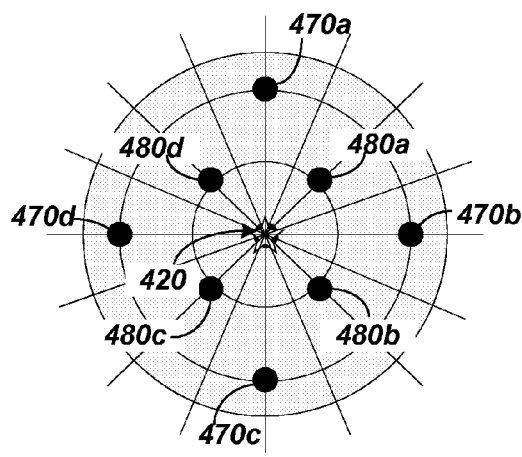
Figure 4D:
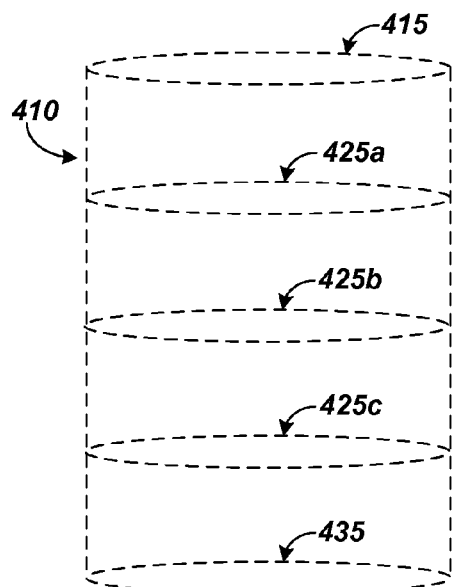

Attention is directed to FIGS. 4A through 4D which depict yet another example of a measurement volume 410. FIGS. 4A through 4C depict top views and FIG. 4D depicts a side view of the measurement volume 410. In this example, the measurement volume 410 may be substantially cylindrical. The measurement volume 410 may include a central location 420. The central location may correspond to a center of a cross section of the measurement volume 410. A cross section may correspond to an intersection of a plane and the measurement volume 410. The plane may not be parallel to an axis of the substantially cylindrical measurement volume 410. For example, a cross section may be substantially ellipsoidal. In another example, a cross section may be substantially circular. One or more cross sections may be defined for the measurement volume 410. For example, FIG. 4D illustrates five cross sections, e.g., cross sections 415, 425a, 425b, 425c, 435.

In an embodiment, a cross section may include a plurality of detection locations. For example, the plurality of detection locations may be distributed as depicted in FIGS. 4A, 4B and/or 4C. In an embodiment, a cross section, e.g., cross sections 415, 425a, 425b, 425c and/or 435, may include a first plurality of detection locations 430 distributed about a central detection location 420. In another embodiment, a cross section may include a second plurality of detection locations, e.g., detection locations 440, 450 and/or 460 distributed about the central detection location 420. Detection locations 440, 450 and/or 460 may be configured to provide a finer positional resolution for acquiring spectral data. Increasing a number of cross sections may result in better resolution in a direction substantially perpendicular to the cross section, e.g., may provide a finer vertical resolution. A finer positional and/or vertical resolution may aid in the detection and/or identification of source of highly directional radiation that may produce non-uniform irradiation. It may be appreciated that a finer vertical resolution may aid in determining an organ-specific effective dose due to radiation from a directional source. In yet another embodiment, a cross section may include a third plurality of detection locations, e.g., detection locations 470*a*, . . . , 470*d*, 480*a*, . . . , and/or 480*d* distributed about the central detection location 420.

A total number of detection locations may depend on a number of cross sections and/or a distribution of detection locations for each cross section. The distributions of detection locations illustrated in FIGS. 4A, 4B and/or 4C may be substantially ellipsoidal and/or substantially circular cross sections depending on an orientation of each cross-section relative to the substantially cylindrical measurement volume 410. FIGS. 4A, 4B and 4C depict three illustrative distributions of detection locations. Other distributions may be known to those of ordinary skill in the art.

Figure 5A:
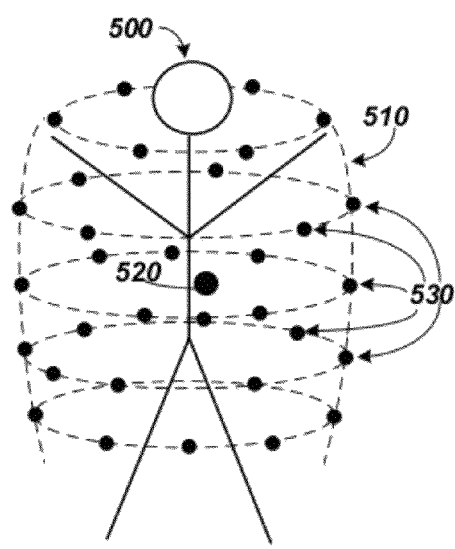
FIGS. 5A and 5B depict illustrative sketches of a volume including a plurality of detection locations consistent with the present disclosure.
Figure 5B:
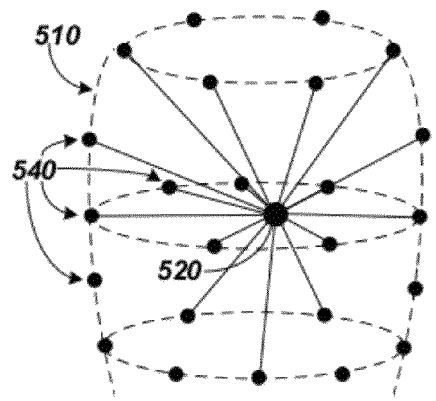

Attention is directed to FIGS. 5A and 5B which depict a measurement volume that may be defined by a plurality of detection locations 530 and/or 540. It may be appreciated that the measurement volumes described above (e.g., FIGS. 2A, 2B, 2C, 3A, 3B, and/or 4D) may be defined prior to acquiring radiation spectral data. In other words, a distribution of detection locations may be predefined. For example, the detection locations may be substantially uniformly distributed about the measurement volume. In contrast, the pluralities of detection locations 530, 540 illustrated in FIGS. 5A and 5B may not all be predefined. For example, a central location 520 may be defined in a region of interest. Radiation spectral data may then be acquired at the central location 520 and/or the pluralities of detection locations 530 and/or 540 distributed about the central location 520. For example, as shown in FIGS. 5A and 5B, the detection locations 530, 540 may correspond to a reach of a human being 500. In another example, the detection locations 530, 540 may correspond to a positioning arm that may be configured to position a detector, e.g., detector 110, in a region of interest. A position of each detection location relative to the central location 520 may define a primary direction.

In some embodiments, a plurality of detection locations may be relatively uniformly distributed over a measurement volume. In other embodiments, the plurality of detection locations may be relatively non-uniformly distributed over the measurement volume. In some embodiments, the measurement volume may be defined prior to acquiring radiation spectral data. In other embodiments, the measurement volume may be defined by the detection locations, i.e., as radiation spectral data is acquired. It may be appreciated that a number of detection locations may depend on a size and/or configuration of the measurement volume. Additionally or alternatively, the number and/or relative positions of detection locations may be based on a desired resolution. For example, it may be desirable to determine a direction of a source of radiation that may be contributing to the radiation field. A finer resolution may aid in detecting and/or determining a direction of the source of radiation.

In an embodiment, a plurality of detection locations may be defined based on radiation spectral data acquired at a first location. For example, the radiation spectral data acquired at the first location may provide an indication that a directional source may be present. The plurality of detection locations may be positioned about the first location configured to provide a relatively finer spatial resolution for determining a direction and/or location of a directional source.

In another embodiment, a second plurality of detection locations may be defined based on radiation spectral data acquired at a first plurality of detection locations. For example, the radiation spectral data acquired at the first plurality of detection locations may provide an indication that a directional source may be present. The second plurality of detection locations may be positioned about the first plurality of detection locations and may be configured to provide a relatively finer spatial resolution for determining a direction and/or location of a directional source.

It may be appreciated that a detected radiation spectrum may depend on a detector location in a radiation field, i.e., a location relative to a radiation source. It may be further appreciated that a detected radiation intensity (e.g., counts per energy, flux per energy) may decrease with distance from the radiation source. For example, the detected radiation intensity may decrease as a function of an inverse of a square of the distance from a point source. Additionally or alternatively, an effect of distance on the detected radiation spectrum may be energy-dependent, e.g., radiation survey measurements may be performed while submerged in an attenuating medium, such as water. For example, a distance between a detection location and a central location and/or a physical dimension of a measurement volume may be adjusted to reduce (e.g., shorter distance, smaller volume) or magnify (e.g., longer distance, larger volume) an energy-dependent effect of distance.

Attention is directed to FIG. 6A which is an illustrative process flow chart 600 for acquiring radiation spectral data (i.e., performing a survey). A location of interest may be selected 610. For example, the location of interest may be a central location, e.g., central location 220, 320, 420 or 520. Radiation spectral data may then be acquired 620 at the location of interest. Radiation spectral data may then be acquired at another location 630. In an embodiment, the another location may be positioned on a surface of a measurement volume, e.g., measurement volume 210, 310, and/or 410. In another embodiment, the another location may not be based on a predefined measurement volume. In this embodiment, a plurality of locations may define the volume. In yet another embodiment, the another location may be positioned relative to the location of interest to provide additional spatial information for characterizing the radiation field and/or locating a radiation source. Whether the survey may be complete, i.e., whether more radiation spectral data may be acquired, may be determined 640. If the survey is not complete, process flow may proceed to step 630. If the survey is complete, the process flow may end 650.

Attention is directed to FIG. 6B which is another illustrative process flow chart 660 for acquiring radiation spectral data. A measurement volume may be selected 665. For example, the measurement volume may be substantially cubic, substantially spherical and/or substantially cylindrical. Selecting a measurement volume may define a plurality of locations for acquiring radiation spectral data, i.e., may define a plurality of detection locations positioned about a surface of the measurement volume. The measurement volume may include a central location. The central location may correspond to the location of interest described above with respect to process flow chart 600. Survey data may then be acquired 670. In an embodiment, survey data may be acquired according to illustrative process flow chart 600.

Attention is directed to FIG. 6C which is an illustrative process flow chart 680 for characterizing a detector, e.g., detector 110. In an embodiment, detector calibration data may be acquired 680 before or after survey data may be acquired, e.g., according to illustrative process flow chart 600. Radiation spectral data detected by a detector may depend on an orientation of the detector in a radiation field. A detector may include features that may affect detector response to radiation. For example, a detector may include a physical structure such as an enclosure and/or handle that may block and/or attenuate some radiation. The physical structure may result in a detector-specific directional and/or orientational dependence in the detected radiation spectral data. In another example, the detector may include support electronics. The electronics may be relatively near a detecting portion of the detector and may prevent radiation from passing relatively freely to the detecting portion. Accordingly, a detector response may be characterized for directionality 685. This directionality data may then be used to correct survey data for detector-specific directionality effects.

A detector response may be characterized for an energy of interest 690, e.g., for an anticipated and/or possible source energy and/or energy range. A detector may detect a radiation field in counts and/or counts per time ("detector response") versus energy. A detector may produce a characteristic spectrum associated with radiation emitted from radioactive materials and/or sources, e.g., $^{40}K$, $^{137}Cs$ and/or $^{57}Co$. A detector response to a monoenergetic source may be a radiation spectrum. The spectrum may include a full energy absorption peak at or near the emission energy of the monoenergetic source and may further include a response at energies less than the source energy due to e.g., Compton and/or backscattering. A detector response characterization may be used to determine an incident energy-dependent radiation flux based on a detected spectrum. A detector may be characterized for detection efficiency 695. Detection efficiency may relate a detector response, i.e., counts and/or counts per time to radiation fluence and/or flux. A detector efficiency characteristic may be energy-dependent. As used herein, radiation fluence may be understood as radiation flux over time (radiation arrival rate per unit area). A detector response may be converted to radiation flux and/or fluence, based on the characterization of the detector.

A result of the process flow depicted in FIG. 6A or FIG. 6B may be a plurality of radiation spectra (i.e., radiation spectral data). Each radiation spectrum may correspond to a location. Each location on a surface of a measurement volume may be a distance from a central location. Each location may be a distance from each other location. For example, the distances between each location on the surface of the measurement volume and the central location may depend on a geometry of the measurement volume. In other words, for a substantially spherical measurement volume, each location on the surface may be substantially equidistant from the central location. For a substantially cubic measurement volume (i.e., a form of a right parallelepiped measurement volume), each edge location may be a first distance from the central location, each corner location may be a second distance from the central location and/or each face location may be a third distance from the central location.

A size of a measurement volume may be selected based on a variety of factors. As used herein, size may be understood as corresponding to a dimension, e.g., length, width and/or height of the measurement volume. For example, a factor may include a desired resolution for the survey data. A relatively larger size may provide relatively greater response differences for the survey data, e.g., a greater change in detector response between a central location and a detection location. The relatively larger size may increase a distance between a location of interest, e.g., a central location, and another location. A relatively larger size, without an increase in a number of detection locations, may interfere with characterizing a highly directional source that may provide non-uniform irradiation of the measurement volume. Characterizing a highly directional source may be improved by increasing the number of detection locations. In another example, a factor may include a work area volume. It may be appreciated that each distance between a central location and a surface of a measurement volume may be related to, i.e., proportional to, the size of the measurement volume.

Figure 7:
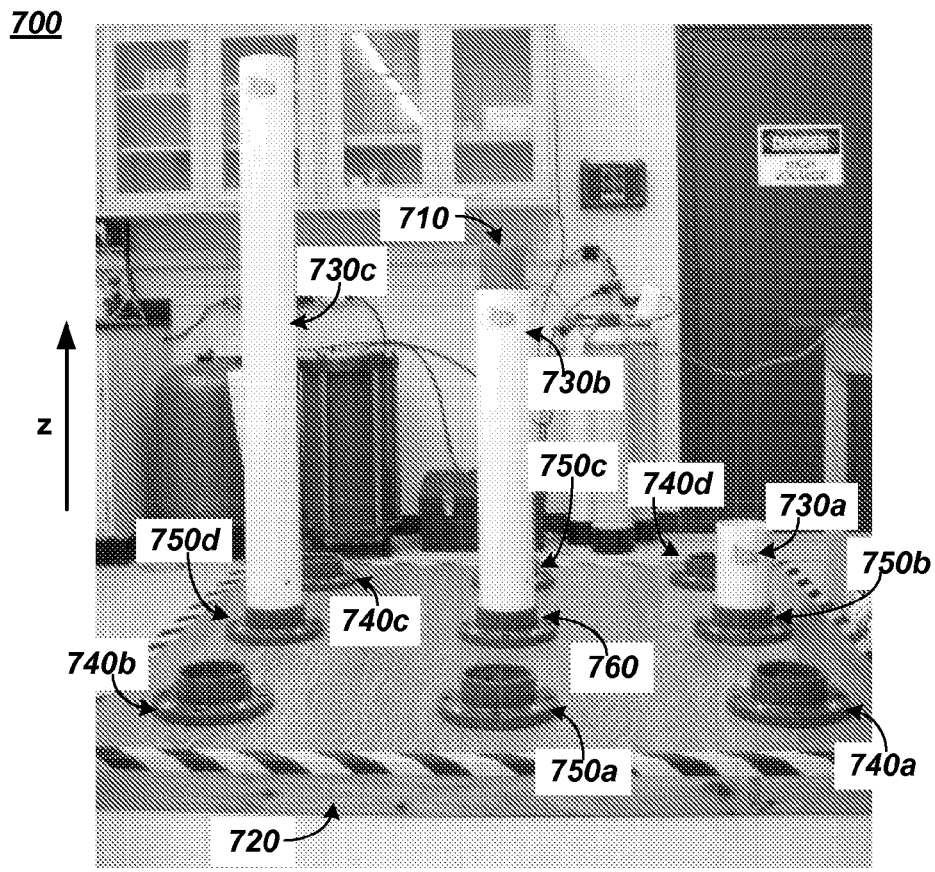
FIG. 7 depicts an illustrative experimental setup for positioning the detector at locations within a survey measurement volume.

Attention is directed to FIG. 7 which shows an example of an experimental setup 700 configured to provide a survey volume for acquiring radiation spectral data. In this example, the survey volume may be substantially cubic, i.e., a volume with substantially equal length, width and height dimensions. A detector 710 (e.g., a spectrometer) may be positioned at a plurality of locations. This setup 700 may include a base 720, configured to position and/or support a mounting for the detector 710. The setup 700 may further include a plurality of mountings, e.g., mountings 730a, 730b, 730c. Each mounting 730a, 730b, 730c, may be configured to position the detector 710 a distance from the base 720. In an embodiment, a first mounting, e.g., mounting 730a, may have a length that is less than a length of a second mounting, e.g., mounting 730b. The length of the second mounting 730b may be less than a length of a third mounting, e.g., mounting 730c.

The base 720 may include a plurality of supports 740a, . . . , 740d, 750a, . . . , 750d, 760, configured to receive a mounting 730a, 730b and/or 730c. Each corner support 740a, 740b, 740c, or 740d may be positioned at or near each corner of the base 720. A combination of the mountings 730a, 730b, 730c and the corner supports 740a, . . . , 740d may be configured to position the detector 710 at each corner (i.e., eight locations) of the survey volume and at each vertical edge (i.e., four locations) of the survey volume. A vertical edge may be understood as an edge of the survey volume substantially parallel to the z-axis as depicted in FIG. 7.

Each face support 750a, 750b, 750c, or 750d may be positioned between and substantially aligned with a pair of adjacent corner supports, e.g., 740a and 740b, 740b and 740c, 740c and 740d or 740d and 740a. A combination of the mountings 730a, 730b, 730c and the face supports 750a, . . . , 750d may be configured to position the detector 710 at each horizontal edge (i.e., eight locations) of the survey volume and on each vertical face (i.e., four locations) of the survey volume. A horizontal edge may be understood as an edge of the survey volume substantially perpendicular to the z-axis as depicted in FIG. 7. A vertical face may be understood as a face of the survey volume substantially parallel to the z-axis as depicted in FIG. 7.

A central support 760 may be positioned between and substantially aligned with opposing pairs of corner supports, e.g., 740a and 740c, 740b and 740d and/or opposing pairs of face supports, e.g., 750a and 750c, 750b and 750d. A combination of the central support 760 and the mountings 730a, 730b, 730c may be configured to position the detector 710 at a central location (i.e., one location) and/or on each horizontal face (i.e., two locations). A horizontal face may be understood as a face of the survey volume substantially perpendicular to the z-axis as depicted in FIG. 7. It may be appreciated that the experimental setup in FIG. 7 may allow a detector 710 to be positioned at the central location and/or each of the twenty six detection locations for the substantially cubic measurement volume shown in FIGS. 2A, 2B and 2C.

Figure 8A:
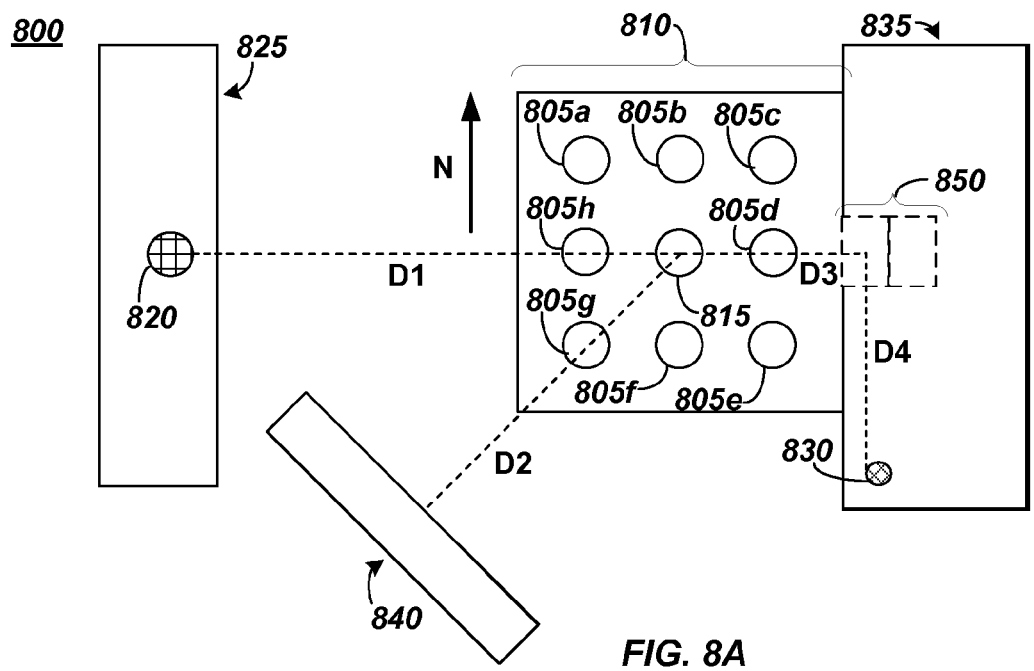
FIGS. 8A and 8B depict sketches of two experimental setups.

Attention is directed to FIG. 8A which depicts a plan view of an exemplary experimental setup 800 for acquiring radiation spectral data over a survey volume. The experimental setup 800 may include a substantially square base 810 that may include a central support 815 and/or a plurality of supports 805a, . . . , 805h positioned about and relative to the central support 815. The plurality of supports 805a, . . . , 805h and/or central support 815 may be configured to receive each of a plurality of mountings, e.g., mountings 730a, 730b and/or 730c. A central location may correspond to a combination of a mounting, e.g., mounting 730b, and the central support 815. The substantially square base 810 may be positioned with a side substantially in parallel with a North compass direction. The North compass direction is signified in FIG. 8A by an arrow with an N.

A radiation field may include radiation from a plurality of sources. A radiation field in an experimental setup, e.g., experimental setup 800, may include background radiation that may naturally be present and/or radiation from a radiation source. A radiation source may be a point source that may radiate omnidirectionally, a volume source that may radiate preferentially in one or more directions and/or another source geometry known to those skilled in the art.

For example, the experimental setup 800 may include a plurality of radiation sources. The plurality of radiation sources may include a first point source 820, a second point source 830, a first volume source 840 and/or a second volume source 850. The first point source 820 may be positioned on a first laboratory table 825. The first laboratory table 825 may be positioned a distance from the base 810 along a West compass direction. The first point source 820 may then be positioned a first distance, D1, from the central support 815. The first point source 820 may be a Caesium isotope, e.g., $^{137}$Cs, and may produce gamma and/or x-ray radiation at or near an energy of 0.66 MeV (million electron volts) and/or may produce beta particles.

The first volume source 840 may be substantially rectangular and may be positioned a distance from the base 810 along a Southwest compass direction. The first volume source 840 may be oriented substantially perpendicular to the Southwest compass direction. A face of the first volume source 840 may then be positioned a third distance, D2, from the central support 815. The first volume source 840 may include a potassium isotope $^{40}$K and may produce gamma and/or x-ray radiation at or near an energy of 1.46 MeV and/or may produce beta particles. The second volume source 850 may be positioned beneath a second laboratory table 835 on a floor and/or may include a potassium isotope $^{40}$K. The second laboratory table 835 may be positioned in a compass direction East of and adjacent the base 810. The second volume source 850 may then be positioned a fourth distance, D3, from the central support 815, along the East compass direction. The second volume source 850 may be configured as a volume that may be larger than a point source but with a dimension less than the first volume source 840.

The second point source 830 may be positioned on the second laboratory table 835. The second point source 830 may then be positioned a fourth distance, D4, from the second volume source 850 along a South compass direction. The second point source 830 may be $^{57}$Co (Cobalt isotope) and may produce gamma and/or x-ray radiation at or near an energy of 0.12 MeV.

It may be appreciated that the experimental setup 700 depicted in FIG. 7 may be combined with the experimental setup 800 depicted in FIG. 8A. In this case, base 810 and supports 805a, . . . , 805h, 815 may be replaced by experimental setup 700. The combination may define a measurement volume in a radiation field and may be configured for acquiring survey data over the measurement volume. Radiation spectral data may be acquired at a plurality of locations defined by and/or defining a measurement volume. A format of the radiation spectral data may be a listing of counts per channel for each location. Each channel may correspond to an energy. The counts per channel may correspond to detector response at the location.

Figure 9A:
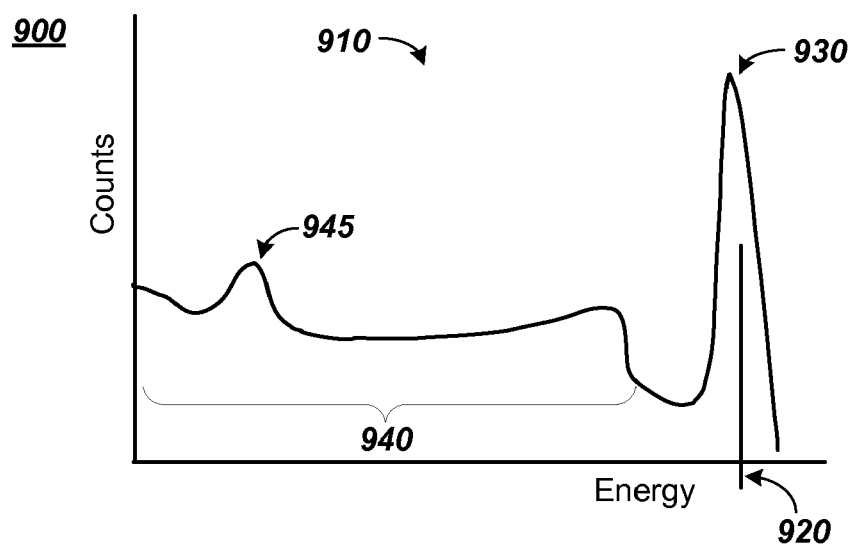
FIGS. 9A through 9C depict illustrative sketches of a detected spectrum for a single monoenergetic source, a detected spectrum for multiple sources and a simplified spectrum for multiple sources, respectively.

It may be appreciated that, as discussed above, a detected radiation spectrum may be associated with a monoenergetic source. FIG. 9A depicts an illustrative sketch 900 of a detected radiation spectrum 910 for a monoenergetic source. As used herein, monoenergetic may be understood as radiation emitted at a single energy and/or a relatively narrow energy distribution. A radiation field and/or incident radiation flux resulting from an ideal monoenergetic source may be depicted as a delta function at the energy, e.g., pulse 920. The detected radiation spectrum 910 may include a full energy absorption peak 930 about the incident energy. A scattered energy 940 may include contributions from Compton scattering and/or backscatter from the detector and/or the environment. For example, the backscatter may include a peak, e.g., backscatter peak 945, in the detected radiation spectrum 910. The scattered energy 940 may be distributed over energies less than the incident energy 920 and/or less than the full energy absorption peak 930. In other words, a mono-energetic source may emit radiation at or, relatively narrowly distributed about, an energy, e.g., pulse 920 while the detected radiation spectrum, e.g., spectrum 910 may be distributed over a range of energies that includes the full energy absorption peak 930 as well as Compton scattering and/or backscatter 940 at lower energies.

Figure 9B:
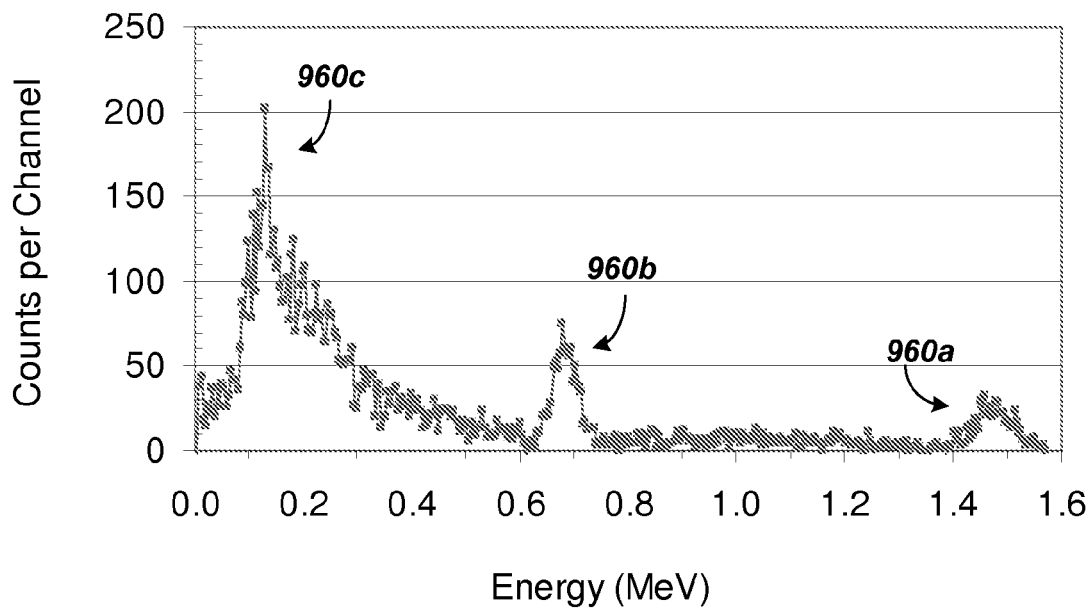

FIG. 9B is an illustrative plot of a radiation spectrum 950 based on radiation spectral data acquired at the central location in the combined experimental setups 700 and 800 and with a count time of, e.g., about 90 seconds for relatively low-intensity source strengths. The experimental setup 800 was configured with D1 about 255 cm (centimeters), D2 about 230 cm, D3 about 82 cm, D4 about 130 cm and with a cubic measurement volume, i.e., experimental setup 700, having a length, width and height of approximately 122 cm (4 feet). The cubic measurement volume was positioned approximately 46 cm (18 inches) above the floor. A detector, e.g., a spectrometer, was positioned at the central location during acquisition of the radiation spectral data. It may be appreciated that a background spectrum was subtracted from the acquired radiation spectral data prior to plotting. This background spectrum may correspond to naturally occurring radiation present in the environment without radiation sources, e.g., radiation sources 820, 830, 840 and/or 850, present.

The radiation spectrum 950 was acquired using 512 channels with each channel corresponding to an energy, e.g., 4.17 keV (kilo electron volts) per channel. The illustrative radiation spectrum 950 was plotted as counts per channel versus energy. The radiation spectrum 950 may include full energy absorption peaks and/or scattered energy that may be due to Compton scattering and/or backscatter. For example, a first relative peak 960a exists at or near an energy of 1.46 MeV, that may correspond to a $^{40}$K source, e.g., first volume source 840 and/or second volume source 850. A second relative peak 960b exists at or near 0.66 MeV, that may correspond to a $^{137}$Cs source, e.g., first point source 820. A third relative peak 960c exists at or near 0.12 MeV, that may correspond to a $^{57}$Co source, e.g., second point source 830. It may be appreciated that the scattered energy from each source may be distributed over energies less than the source incident energy.

Accordingly, the third relative peak 960c may include contributions from scattered energy due, at least in part, to higher energy sources, e.g., sources 820, 840, 850.

Figure 10A:
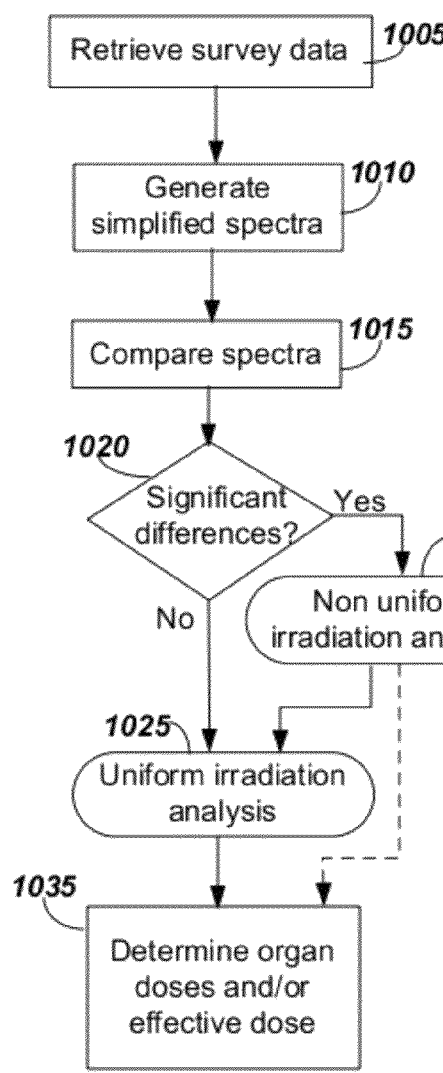
FIGS. 10A through 10C depict illustrative process flow charts consistent with the present disclosure.
Figure 10B:
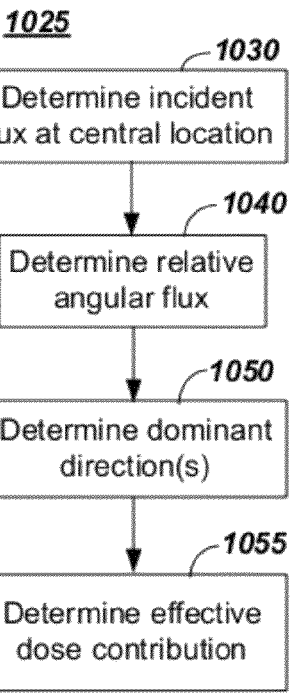
Figure 10C:
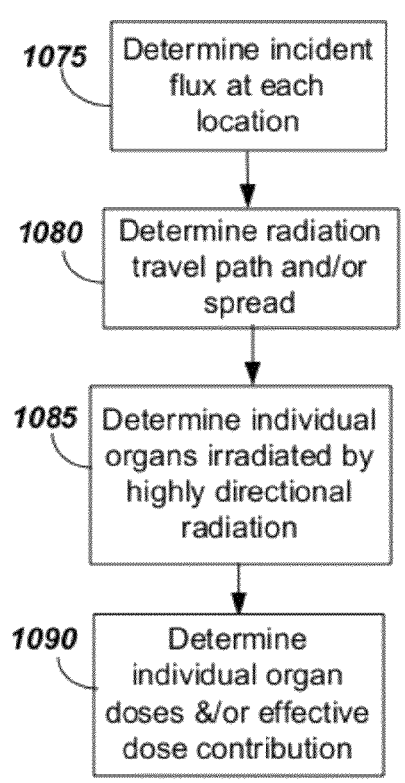

Attention is directed to FIGS. 10A through 10C which depict illustrative process flow charts for analyzing survey data, e.g., survey data acquired according to process 600 and/or process 660. Process flow may begin at step 1005, retrieve survey data. Simplified spectra may then be generated 1010. A simplified spectrum may be generated for each radiation spectrum, i.e., for each location. As used herein, a simplified spectrum may be understood as a spectrum where per energy, i.e., per channel, detector responses have been grouped into bins, each bin corresponding to a range of energies.

Figure 9C:
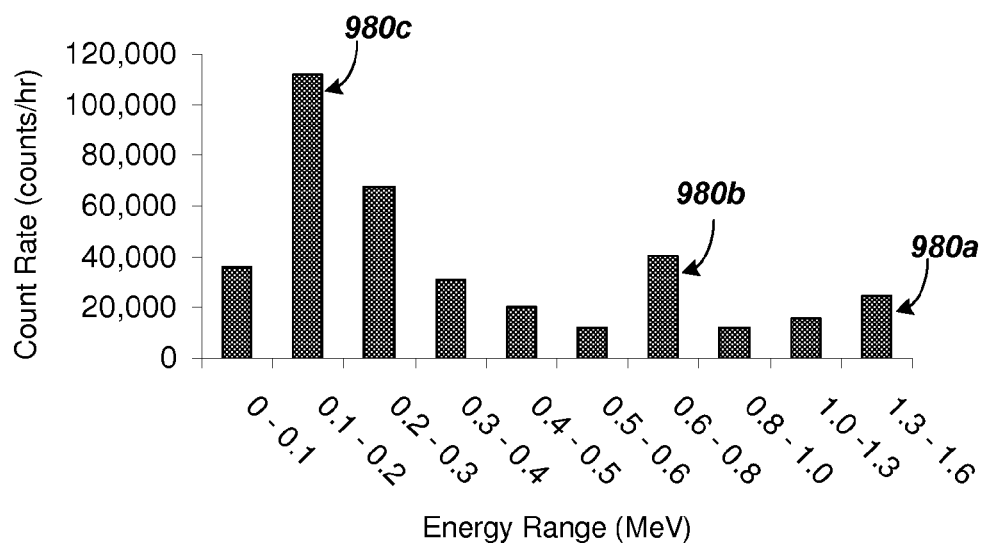

Attention is directed to FIG. 9C which illustrates a simplified radiation spectrum 970 based on radiation spectrum 950. To generate the simplified radiation spectrum 970, a plurality of channels were grouped into a number of energy ranges ("bins"). For example, as shown in FIG. 9C, the number of bins may be ten. A greater or fewer number of bins may be used. It may be appreciated that, for subsequent analyses, a smaller number of bins (i.e., a larger energy range per bin) may reduce computation time but may limit energy resolution. On the other hand, a larger number of bins may improve energy resolution but may be limited by detector resolution.

A per bin energy range may vary for a simplified spectrum. In other words, it is not necessary that each bin size (i.e., energy range) be the same. An energy range may be defined based on an emission energy and/or energies of anticipated and/or known sources. For example, an energy range may be defined to include a full energy absorption peak of an anticipated source. An energy range may be adjusted based on whether a bin contains multiple full energy absorption peaks and/or includes a peak on a bin boundary. The number of bins and/or energy range of each bin may be configured to include a full range of detector response energy.

For example, radiation spectrum 950 is divided into ten bins, 0 to 0.1 MeV (million electron volts), 0.1 to 0.2 MeV, 0.2 to 0.3 MeV, 0.3 to 0.4 MeV, 0.4 to 0.5 MeV, 0.5 to 0.6 MeV, 0.6 to 0.8 MeV, 0.8 to 1.0 MeV, 1.0 to 1.3 MeV, and 1.3 to 1.6 MeV. Comparing FIG. 9B and FIG. 9C, peak 960a may correspond to peak 980a (i.e., energy range 1.3 to 1.6 MeV), peak 960b may correspond to peak 980b (i.e., energy range 0.6 to 0.8 MeV) and peak 960c may correspond to peak 980c (i.e., energy range 0.1 to 0.2 MeV). In an embodiment, radiation spectral data, e.g., counts per channel and/or energy, associated with a full energy absorption peak, e.g., peaks 960a, 960b and/or 960c, may be retained. This retained radiation spectral data may provide a detail regarding a full energy absorption peak that may not be as evident in a simplified spectrum.

In an embodiment, the number and/or energy ranges of the energy bins may be determined based on a detected radiation spectrum of a location of interest, e.g., a central location. In another embodiment, a predefined number of energy bins and/or predefined energy ranges may be used. In yet another embodiment, a predefined number of energy bins and/or predefined energy ranges may be provided and may be adjusted based on the detected radiation spectrum of the location of interest. For subsequent analyses, the number and energy ranges of the energy bins may be used for each spectrum in a set of survey data (i.e., radiation spectra for a plurality of detector locations).

Turning again to FIG. 10A, after simplified spectra have been generated 1010, simplified spectra may be compared 1015. A survey data set may include a plurality of radiation spectra. Each detection location, i.e., a location in or on a measurement volume, may have an associated simplified radiation spectrum. In an embodiment, the plurality of simplified spectra may be compared by energy bin, i.e., energy range. In other words, for an energy range, detector responses at each location may be compared. This comparison may then be repeated for each energy bin. Additionally or alternatively, shapes of simplified spectra, i.e., relative magnitude of detector response over all energy bins within a simplified spectrum, also may be compared.

Whether there are significant differences may then be determined 1020. A significant difference may be understood to include a difference between spectral shapes detected at adjacent locations and/or a difference between a detector response for an energy bin at a first location and a detector response at a second location for that energy bin. For example, differences in spectral shapes at adjacent locations may indicate that a relatively highly directional source may be present and contributing to the radiation field. In another example, for an energy bin, a location associated with a maximum detector response may be determined. Detector responses for that energy bin in other simplified spectra may then be compared to the maximum detector response. Relatively large differences may indicate that a relatively highly directional source may be contributing to the radiation field and that a non-uniform radiation analysis should be performed 1070. In yet another example, a significant full energy absorption peak, i.e., photopeak, identified at a number of detector locations that is less than the total number of detector locations may indicate the presence of a highly directional radiation source. Relatively small differences may indicate that no highly directional source may be contributing to the radiation field, i.e., a uniform irradiation analysis may be performed 1025.

Accordingly, if the spectral comparison step 1015 yields significant differences then the nonuniform irradiation analysis may be performed 1070. If the spectral comparison step 1015 does not yield significant differences, the uniform irradiation analysis 1025 may be performed. In an embodiment, a uniform irradiation analysis 1025 may be performed after a non-uniform irradiation analysis 1070. In another embodiment, a uniform irradiation analysis 1025 may not be performed after a non-uniform irradiation analysis 1070. Effective dose from irradiation contribution(s), i.e., uniform, non-uniform, or both, may then be determined 1035.

Figure 8B:
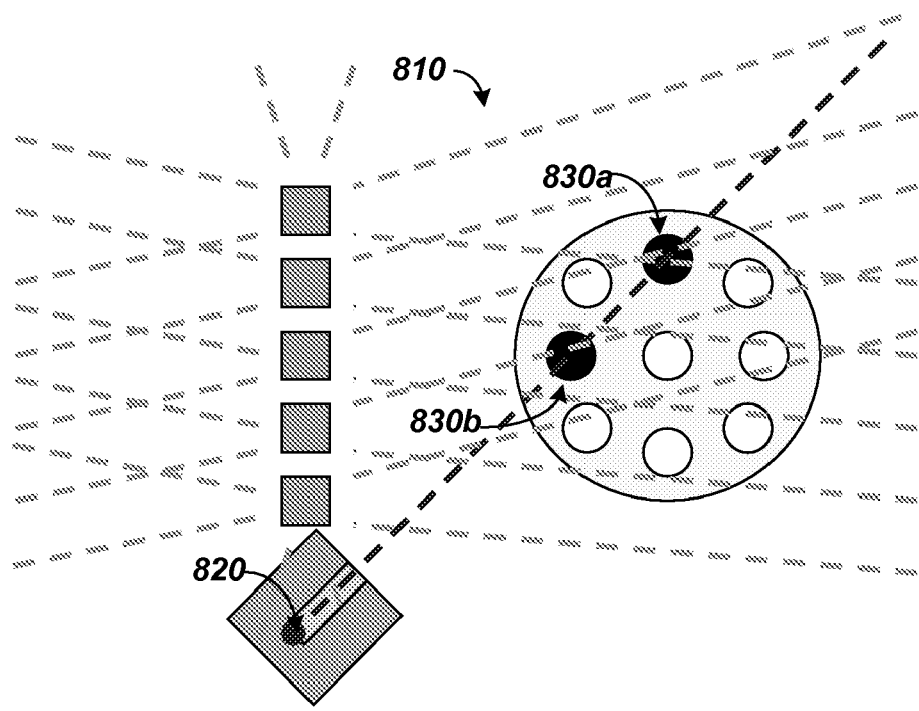

It may be appreciated that analysis of a radiation field and/or an effective dose determination may depend on whether the radiation field includes a contribution from a highly directional source. For example, for a radiation field without contributions from a highly directional source, incident radiation at a central location may include contributions from all sources. Depending on its relative location and/or direction, radiation from a highly directional source may not pass through the central location, therefore, incident radiation at the central location may not include contributions from all sources. For example, FIG. 8B depicts a top view of a radiation field 810 that may include a contribution from a directional source 820. A plurality of detection locations, e.g., detection locations 830a and/or 830b, may be aligned with a direction of the directional source 820. Additionally or alternatively, as discussed in more detail below, determination of effective dose may include organ-specific calculations for non-uniform irradiation of the body, e.g., when a radiation field includes contributions from a highly directional source.

Attention is directed to FIGS. 10B and 10C which depict process steps for uniform irradiation analysis 1025, e.g., where either no relatively highly directional source has been detected or a relatively highly directional source has been detected and analyzed, and non-uniform irradiation analysis 1070, e.g., where a relatively highly directional source has been detected, respectively. Turning first to FIG. 10B, uniform irradiation analysis 1025, incident flux may be determined at a central location 1030. It may be appreciated that incident fluence may then be determined, based on the incident flux. Incident flux may be determined based on a radiation spectrum, i.e., detector response, detected at the central location and/or a detector characterization step, e.g. step 690. As discussed above, with respect to generating simplified spectra 1010, the radiation spectrum may include a detector response peak ("full energy absorption peak") at or near an energy of a source contributing to the radiation field. As further discussed above, the detector response may be characterized at the energy of interest 690, to provide a relationship between detector response (counts per time) and radiation flux and/or fluence.

In an embodiment, incident flux at the central location may be determined 1030 using spectral processing, e.g., spectral subtraction. For example, for a radiation field that may include contributions from multiple sources, i.e., whose detected spectrum includes multiple peaks, e.g., radiation spectrum 950 and/or simplified spectrum 970, incident flux may be determined using spectral subtraction. A characteristic spectrum associated with the highest full absorption peak energy may be scaled by a value corresponding to the full energy absorption peak. In an embodiment, an amplitude of the full energy absorption peak may be used. In another embodiment, a detector response for an energy bin containing the full energy absorption peak may be used. This process may be repeated for each full energy absorption peak, beginning with a highest energy peak and ending with a lowest energy peak.

Figure 11A:
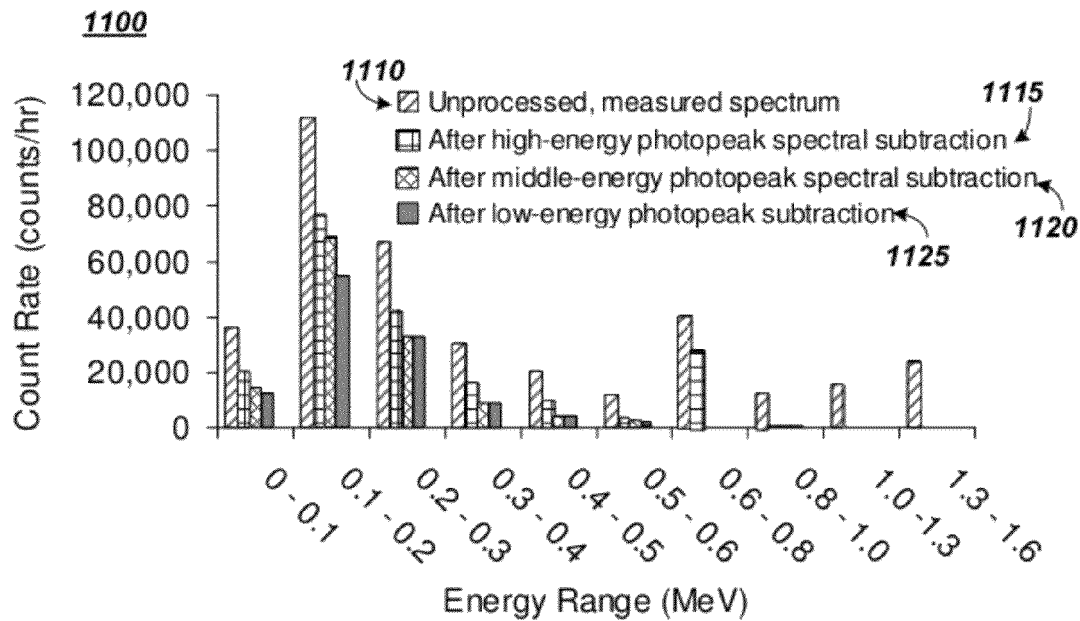
FIGS. 11A and 11B depict sketches illustrating spectral processing.
Figure 11B:
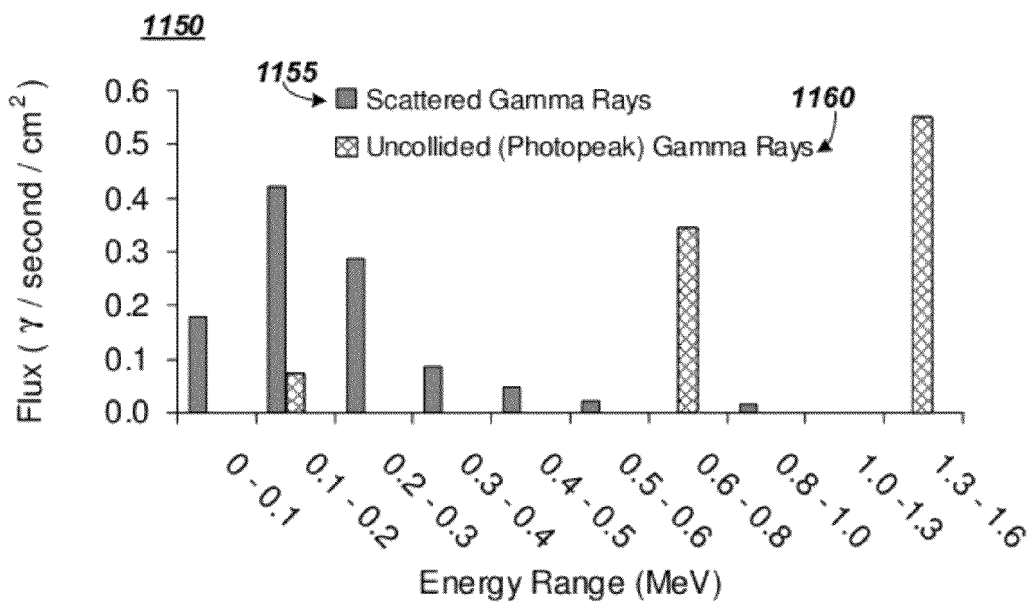

It may be appreciated that, after subtracting the scaled characteristic simplified spectrum of the lowest energy source, scattered energy may remain. Incident flux associated with the scattered detected radiation may be determined based on detector efficiency, e.g., efficiency determined at step 695. FIGS. 11A and 11B illustrate incident flux determination based on a detected radiation spectrum at a central location for the exemplary combined experimental setups 700, 800. FIG. 11A depicts simplified spectra 1100, including a simplified detected spectrum 1110, and spectra 1115, 1120, 1125, respectively, remaining after each spectral subtraction step. FIG. 11B depicts simplified spectra 1150, in flux per energy range, for scattered radiation 1155 and uncollided (unscattered) radiation 1160 associated with the sources 820, 830, 840 and 850. Accordingly, energy-dependent incident flux may be determined for a location, e.g., central location, based on a detected spectrum and detector characterization. Energy-dependent fluence may then be determined based on the incident flux and/or measurement time. It may be appreciated that the incident flux may correspond to an intensity of a radiation field at a location.

It may be appreciated that effective dose rate may depend, at least in part, on energy-dependent fluence of radiation and a relative direction of the fluence. Directionality of the fluence may be determined based, at least in part, on survey data, e.g., based on a detector response difference that may be associated with each detection location. A detector response difference associated with a detection location may be understood as an energy-dependent difference between a detector response at a central location and a detector response at the detection location. A detection location may be understood as a location positioned about a surface of a measurement volume, relative to a central location. Additionally or alternatively, a detector response difference associated with a detection location may be associated with a primary direction. A primary direction may be understood as a direction defined by a line that passes through the central location and a detection location. Relative angular flux may be understood as a ratio of a detector response difference for a detection location (i.e., primary direction) and a sum of positive detector response differences for a plurality of detection locations (i.e., primary directions). It may be appreciated that relative angular flux associated with a location may depend on energy and a direction.

It may be appreciated that angular flux may depend on incident flux and/or relative angular flux. As discussed above, incident flux may be energy-dependent and relative angular flux may be energy- and direction-dependent. Accordingly, angular flux may be energy- and direction-dependent. Angular flux may be determined by portioning an incident flux detected at a location to a primary direction according to a relative angular flux associated with the primary direction. For example, an angular flux for an energy or energy range and a primary direction may be determined by multiplying the incident flux for that energy or energy range by the relative angular flux for that energy or energy range and that primary direction.

Turning again to FIG. 10B, a relative angular flux may then be determined 1040. The relative angular flux may be determined based on the survey data retrieved at step 1005. The survey data may include detected radiation spectra at a central location and a plurality of detection locations defined by and/or defining a measurement volume, e.g., measurement volume 210, 310, 410, and/or 510. Relative angular flux may be determined, for an energy bin, based on the simplified spectra generated at step 1010.

Energy-dependent detector responses at the central location and the plurality of detection locations may be used to determine a direction of a radiation flux associated with a radiation source incident on a detector positioned at the central location ("incident radiation flux"). The incident radiation flux, e.g., may be energy-dependent. A detector response at a location relatively closer to a radiation source may be greater than a detector response at a location relatively farther from the source. The two locations may be at least partially aligned with a direction of the incident radiation flux. Accordingly, detector responses over a survey volume may be used to characterize a directionality of the incident radiation flux at the central location.

In an embodiment, relative angular flux may be determined based on a detector response difference. The detector response difference may be normalized, e.g., by dividing by a distance between the detector location and the central location. For example, for a measurement volume where not all detector locations are equidistant from the central location, i.e., nonspherical volumes, a detector response difference may be normalized. Equation (1) below illustrates an example of normalizing a detector response difference.

$$I_E(x,y,z) = [R_E(x,y,z) - R_E(0,0,0)]/d(x,y,z) \quad (1)$$

where $R_E(x,y,z)$ is a detector response for an energy bin, E, at detection location (x,y,z), $R_E(0,0,0)$ is the detector response for the energy bin, E, at a central location, defined as (0,0,0), and $d(x,y,z)$ is a distance from the central location (0,0,0) to the detection location (x,y,z), e.g., $(x^2+y^2+z^2)^{1/2}$.

In an embodiment, Equation (1) may be modified for survey measurements within an attenuating medium, e.g., water. The numerator of Equation (1) may be multiplied by an exponential factor, e.g., exp[−u(E)d(x,y,z)], where u(E) is an energy-dependent linear attenuation coefficient for the attenuating medium.

In another embodiment, a detector response difference may be normalized by, e.g., dividing by a square of a distance between a detection location and the central location. For example, normalizing by the square of the distance may be applicable for radiation fields produced by sources known to be point sources and/or sources having a small physical dimension and/or positioned at a relatively large distance from the measurement volume. For radiation fields where a source geometry and/or source distance to the measurement volume may not be known, normalizing by distance between a detection location and the central location may be appropriate.

A detector response difference may be determined for each of the plurality of detection locations associated with a measurement volume, for the energy bin (range). It may be appreciated that a detector response difference may be negative, e.g., a detector response at a central location may be greater than a detector response at a detection location. In an embodiment, a negative detector response difference may be set to zero. In this embodiment, directionality may be preserved based on positive response differences, i.e., a positive detector response difference associated with a direction may suggest a negative detector response difference associated with an opposite direction.

Positive detector response differences may then be summed. An energy-dependent relative angular flux ("relative angular flux") may then be determined based on the sum of the positive detector response differences. In an embodiment, the relative angular flux associated with a detection location, i.e., for a primary direction defined by the detection location relative to the central location, may be determined as a ratio of a positive detector response difference for the detection location and the sum of the positive detector response differences for the measurement volume. It may be appreciated that a sum of all the relative angular fluxes for an energy range for the measurement volume may equal one. Relative angular flux may be similarly determined for each energy bin in the simplified spectrum.

It may be appreciated that relative angular flux may provide an indication of source direction for incident radiation associated with the central location. It may be further appreciated that determining the relative angular flux for each energy range may facilitate differentiating lower energy radiation produced by a lower energy source from lower energy radiation that may be a result of scattered energy from a higher energy source.

In an embodiment, relative angular flux may be displayed 1045. For example, for each energy range, relative angular flux may be displayed for a measurement volume. In order to relate the relative angular flux to the measurement volume, a three-dimensional image of the measurement volume may be generated and displayed. The relative angular flux determined for each location may then be associated with that location on the three-dimensional image. For example, each relative angular flux may have a magnitude, i.e., a numerical value, e.g., a fraction between zero and one. In an embodiment, each magnitude or range of magnitudes may be indicated by a color on the three-dimensional image. For example, colors may include red, yellow, green, blue and/or purple where a relatively large magnitude may be indicated by red, a relatively small (nonzero) magnitude may be indicated by purple with intermediate magnitudes indicated by yellow, green and/or blue. A magnitude of zero may be indicated as black. The three-dimensional image may include contour lines between locations with similar magnitudes.

Accordingly, the displayed three-dimensional image of the measurement volume with magnitudes of relative angular fluxes indicated by regions of color may provide a visual indication of directionality for the relative angular flux. The three-dimensional image may further provide a visual indication of a dominant direction for the relative angular flux for each energy range.

A dominant direction or directions for the incident radiation flux may then be determined 1050. The dominant direction or directions may be based on one or more relative angular fluxes, e.g., relative angular fluxes determined at step 1040.

A dominant direction, based on survey data, may be defined in three dimensions. Effective dose may depend on the dominant direction, e.g., orientation of a receptor relative to a direction of radiation flux. Effective dose may depend on kerma, energy and/or relative orientation conversion coefficients. As used herein, kerma may be understood as a measure of an amount of radiation energy of charged particles, liberated by uncharged ionizing radiation in a unit mass. Conversion coefficients may be defined that relate effective dose to kerma based on energy and/or orientation of a receptor. Conversion coefficients may be defined to relate fluence to kerma. Conversion coefficients may be specified in terms of kerma for uncharged ionizing radiation, e.g., gamma rays and/or x rays. Conversion coefficients may not be specified in terms of kerma for other radiation types, e.g., electrons, protons and/or neutrons. For the conversion coefficients, the orientation of the receptor may be defined only for a horizontal plane. Accordingly, it may be desirable to determine a dominant direction based on two, i.e., horizontal, dimensions.

In an embodiment, a two-dimensional kerma fraction may be defined, based on relative angular flux values. Two-dimensional dominant directions may then be determined. For example, for each horizontal direction, e.g., a compass direction, a kerma fraction may be determined as a sum of relative angular fluxes for a height at the horizontal location divided by a sum of relative angular fluxes, excluding the relative angular fluxes for detection locations above and/or below the central location.

Determination of effective dose contribution, e.g., step 1055, may be based, at least in part, on conversion coefficients that may relate effective dose to kerma. Kerma may be determined based on incident fluence and conversion factors. An effective dose determination may be energy- and/or direction-dependent, i.e., may depend on an orientation of a receptor relative to a direction of incident radiation flux for an energy range. It may be appreciated that the conversion coefficients that relate effective dose to kerma, may be defined for a finite number of directions. For example, the conversion coefficients may include only horizontal directions, i.e., may not include a height direction. Additionally or alternatively, the conversion coefficients may include a limited number of horizontal directions. For example, the conversion coefficients may include eight or fewer horizontal directions. The horizontal directions may correspond to compass directions and/or angles, e.g., N, S, E, W, NE, SE, NW, SW and/or 0°, 45°, 90°, 135°, 180°, 225°, 270°, 315°. Conversion coefficients may be estimated by interpolation for "in-between" directions.

It may be appreciated that the relative angular flux data may provide finer resolution for apportioning incident radiation. Since the conversion coefficients may be defined for a limited number of horizontal directions, it may be desirable to convert the relative angular flux data to a kerma fraction that may be defined for a limited number, e.g., eight, horizontal directions. The kerma fraction may then be related to kerma and converted to effective dose using published kerma-to-effective-dose conversion coefficients. Accordingly, step 1050, determine dominant directions, may include converting the relative angular flux data into kerma fractions.

For example, as discussed above, each horizontal direction may include a plurality of primary directions, each including one or more vertical components, e.g., detector locations at different heights. A kerma fraction for a horizontal direction may be determined based on relative angular flux data for that direction. For example, the kerma fraction for the horizontal direction may be determined by adding the height-dependent positive relative angular fluxes for the horizontal direction and dividing by a sum of positive relative angular fluxes for each of the horizontal directions. A relative angular flux associated with a central height location may be excluded.

Dominant radiation direction(s) may then be determined based on a flux fraction and/or a kerma fraction. A flux fraction may be understood as an energy-dependent relative angular flux ("relative angular flux"). It may be appreciated that a horizontal direction, e.g., a compass direction, may generally not align with a direction of incident radiation. It may be further appreciated that a radiation direction that falls between two horizontal directions may result in nonzero detector responses at the locations corresponding to the two horizontal directions. It may therefore be desirable to determine a dominant direction based on flux fractions and/or kerma fractions. It may be appreciated that a directionality of a flux fraction may correspond to a directionality of an associated kerma fraction. Dominant directions may be determined for each energy range. Kerma may then be assigned to one or more dominant directions.

For example, a dominant direction may be determined for each energy range as follows. A fraction, i.e., flux and/or kerma, threshold may be determined. For example, a fraction threshold may correspond to 1/n, where n may be equal to a number of horizontal directions. Accordingly, for eight compass directions, n may equal eight, and the fraction may be one-eighth. Each direction whose fraction exceeds the threshold may then be determined. If only one fraction exceeds the threshold, the direction associated with that threshold may be a dominant direction.

If more than one fraction exceeds the threshold, then for the fractions that exceed the threshold, the two largest fractions and their associated directions may be compared. If their associated directions are adjacent and their fractions differ by less than a minimum difference, both directions may be considered dominant. In an embodiment, a minimum difference may be defined based on the largest fraction. For example, a minimum difference may be defined as a percentage of the largest fraction. For example, the percentage may be thirty. If their fractions differ by more than a minimum difference, the direction associated with the largest fraction may be dominant, and a relatively small fraction from a direction adjacent to the dominant direction may be added to the dominant fraction. Fractions associated with nondominant directions adjacent to the dominant direction may be added to the dominant direction fraction. If the associated directions for the two largest fractions are not adjacent, then both directions may be considered dominant. A fraction associated with a direction adjacent to the dominant direction may be added to the dominant fraction. If only one direction is between the dominant directions, its fraction may be apportioned to the dominant directions. The apportionment may be equal and/or may be a function of a relative size of the two dominant fractions. Apportioning a fraction to an adjacent direction may not be desirable if the original fraction is greater than the fraction of one of the adjacent directions. In this case, more than two directions may be dominant.

Effective dose contribution may then be determined 1055. An effective dose contribution may include an energy-dependent contribution and/or may be determined for a plurality of energy bins. Determination of effective dose contribution may be based on incident fluence and/or an orientation of a receptor relative to a direction of the incident fluence. Effective dose contribution may be determined based on kerma and a direction-weighted effective dose coefficient. Kerma may be determined based on incident fluence and kerma per unit fluence conversion factors. A direction-weighted effective dose coefficient may be determined based on a kerma fraction associated with a source direction and/or an effective dose coefficient based on a difference between the source direction and a receptor facing direction. It may be appreciated that the determining dominant direction(s) step 1050 may result in more than one dominant direction, i.e., indicating a plurality of source directions. A kerma fraction may be associated with each of the plurality of source directions. In an embodiment, the direction-weighted effective dose coefficient may be determined based on the plurality of kerma fractions and/or their associated source directions. Effective dose contribution 1055 may be determined for a receptor-facing direction in a radiation field containing contributions from a plurality of sources based on survey data. Process flow may then proceed to step 1035.

Attention is directed to FIG. 10C which depicts a process flow for determining effective dose for a radiation field that may include incident radiation flux from a relatively highly directional radiation source ("directional source"). Incident flux at each location may be determined 1075. Additionally or alternatively, determining incident flux at each location may include determining a significance of highly directional radiation. Incident flux may be determined using spectral processing, similar to the spectral processing described with respect to step 1030. Unlike step 1030, incident flux may be determined for a plurality of detection locations, e.g., each detection location with an associated simplified detected spectrum that may have been determined to be "significantly different" at step 1020, e.g., by shape or full energy absorption peaks. In other words, in a uniform irradiation analysis, e.g., step 1025, incident radiation flux at a central location may be determined 1030. Relative angular flux may be determined 1040 based on simplified spectra comparisons between the central location and a plurality of detection locations. It may be appreciated that this analysis may depend on similarities, i.e., a lack of significant differences, in the simplified spectra that suggest that highly directional radiation sources may not be contributing to the detected spectra. Accordingly, determining incident flux at the central location, e.g., step 1030, and relative angular flux relative to the central location, e.g., step 1040, may provide a sufficient basis for determining effective dose contribution. In a non-uniform irradiation analysis, e.g., step 1070, detected spectra may include significant differences. These differences may be a result of contributions from relatively highly directional radiation sources. Accordingly, it may be desirable to determine and/or compare incident flux for a plurality of detection locations. In some embodiments, a spectral comparison, e.g., for a directional source, may not include the spectrum at the central location.

It may be appreciated that radiation from a directional source may be more noticeable in incident flux data than in detector response spectral data. A significance of the directional source relative to other radiation sources may also be evident in the incident flux data. Additionally or alternately, a significance of a directional source may be assessed by comparing individual organ dose or effective dose rates from the directional source to results from other radiation sources.

Radiation travel path and spread for a directional source may then be determined 1080. The travel path may be determined based on a detector response and/or relative positions of detection locations whose detected and/or simplified spectra appeared to include the directional source radiation. For example, additional full energy absorption peak responses at a plurality of detection locations may indicate a source of directional radiation may be located along a linear travel path or spread of paths that intersects each of the plurality of detection locations. For example, the source may be located closer to a detector location with a greater peak response. A distance of the source from the each of the plurality of detection locations may be determined based on the detector response at each of the plurality detection locations and a distance between the detection locations. In this situation, a detector response spectrum at a central location may not be representative of radiation flux at all detection locations associated with a measurement volume because a directional source may result in non-uniform irradiation of the measurement volume.

In an embodiment, additional survey spectral data may be acquired, e.g., adjacent detection locations where radiation from a directional source was detected. The additional survey data may be configured to aid in determining a travel path and its spread, e.g., at step 1080. For example, the additional survey data may provide a greater resolution in determining a location of a directional source and/or individual organ irradiated. Individual organ doses and/or effective dose contributions may then be determined 1090.

Turning again to FIG. 10A, organ doses and/or an effective dose may then be determined 1035. Individual organ doses and/or effective (e.g., whole body) dose may be determined 1035 based on contributions from uniform irradiation analysis 1025 and/or non-uniform irradiation analysis 1070. For example, for radiation fields that may include a directional source, organ doses and/or effective dose may be determined based on non-uniform irradiation analysis 1070 and uniform irradiation analysis 1025. In another example, the organ doses and/or effective dose may be determined based on non-uniform irradiation analysis 1070. It may be appreciated that, in this example, individual organ doses may be equivalent to organ doses and effective dose contribution may be equivalent to effective dose, i.e., from non-uniform irradiation. The non-uniform irradiation analysis may depend on an organ dose for an organ/tissue non-uniformly irradiated and a tissue weighting factor. The travel path and its spread, associated with non-uniform radiation, may be used in effective dose calculations. It may be appreciated that the effective dose calculations may include organ and/or tissue effective doses for organs/tissues that may be irradiated by the directional radiation.

Figure 12:
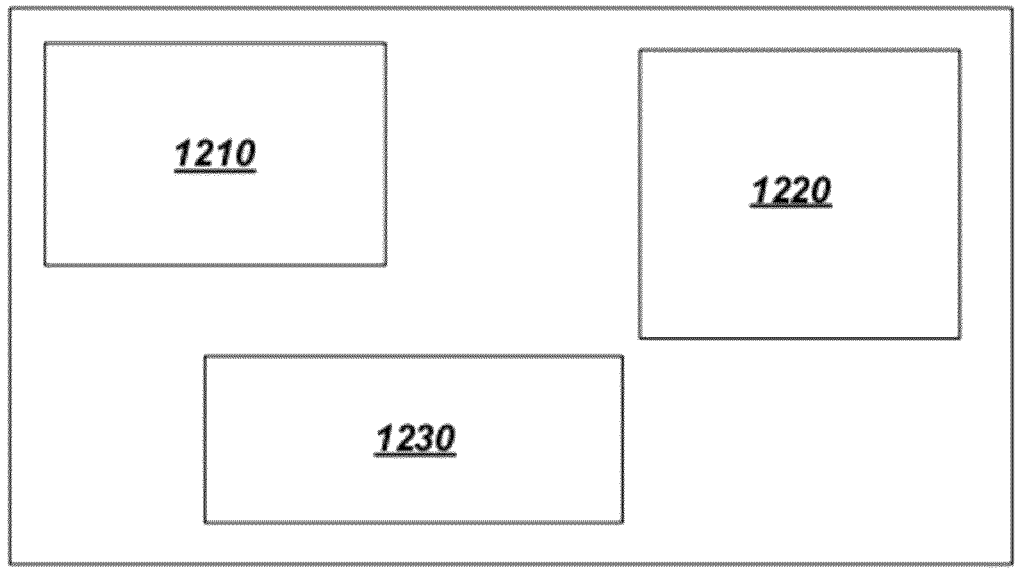
FIG. 12 illustrates an example of a system and method for METHOD PREAMBLE that contains a processor, machine readable media and a user interface.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 12, the system and method for acquiring radiation spectral data in a radiation field and determining effective dose rate and identifying localized radiation sources may contain a processor (1210) and machine readable media (1220) and user interface (1230).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A method comprising:
retrieving an energy-dependent radiation spectrum associated with a location in a radiation field, said energy-dependent radiation spectrum comprising counts versus energy;
retrieving at least one other radiation spectrum associated with at least one other location in said radiation field;
generating a first simplified spectrum and at least one other simplified spectrum based on said retrieved radiation spectra; and
determining a dominant direction or a radiation travel path, based at least in part, on said simplified spectra.

2. The method of claim 1 further comprising comparing said first simplified spectrum and said at least one other simplified spectrum.

3. The method of claim 2 further comprising determining whether said radiation field included radiation from a directional source based on said comparison.

4. The method of claim 1 further comprising determining a first incident flux associated with said location based, at least in part, on said first simplified spectrum.

5. The method of claim 4 wherein said determining said first incident flux includes spectral processing.

6. The method of claim 5 wherein said spectral processing includes spectral subtraction.

7. The method of claim 4 further comprising determining at least one other incident flux associated with said at least one other location based, at least in part, on said at least one other simplified spectrum.

8. The method of claim 1 further comprising determining a relative angular flux for each at least one other simplified spectrum based, at least in part, on said first simplified spectrum.

9. The method of claim 8 further comprising displaying said relative angular flux.

10. The method of claim 1 further comprising determining an angular flux based, at least in part, on said first simplified spectrum.

11. The method of claim 1 further comprising determining an effective dose contribution or an individual organ dose, based at least in part, on said simplified spectra.

12. The method of claim 1 further comprising determining an effective dose, based at least in part, on said simplified spectra.

13. A system comprising:
- a detector configured to
  - (a) acquire energy-dependent radiation spectral data at a location of interest in a radiation field wherein said energy-dependent radiation spectral data comprises counts versus energy, and
  - (b) acquire radiation spectral data at at least one other location wherein said at least one other location is positioned relative to said location of interest; and
- a position sensor configured to sense a position of said detector; and
- a processor configured to
  - (c) generate a first simplified spectrum and at least one other simplified spectrum based on said acquired energy-dependent radiation spectral data;
  - (d) determine a dominant direction or a radiation travel path, based at least in part, on said simplified spectra.

14. The system of claim 13 further comprising:
- a display coupled to said processor and configured to display said radiation spectral data; and
- a user interface coupled to said processor.

15. The system of claim 13 further comprising an orientation sensor configured to sense an orientation of said detector.

16. An article comprising a non-transitory storage medium having stored thereon instructions that when executed by a machine result in the following operations:
- retrieving an energy-dependent radiation spectrum associated with a location in a radiation field, said energy-dependent radiation spectrum comprising counts versus energy;
- retrieving at least one other radiation spectrum associated with at least one other location in said radiation field;
- generating a first simplified spectrum and at least one other simplified spectrum based on said retrieved radiation spectra; and
- determining a dominant direction or a radiation travel path, based at least in part, on said simplified spectra.

17. The article of claim 16 wherein said following operations further comprise determining a relative angular flux for each at least one other simplified spectrum based, at least in part, on said first simplified spectrum.

18. The article of claim 16 wherein said following operations further comprise determining an angular flux based, at least in part, on said first simplified spectrum.

19. The article of claim 16 wherein said following operations further comprise determining an effective dose, based at least in part, on said simplified spectra.

* * * * *